(12) United States Patent
Van Rijswick et al.

(10) Patent No.: US 8,240,900 B2
(45) Date of Patent: *Aug. 14, 2012

(54) LIGHTING DEVICE

(75) Inventors: Mathias Hubertus Johannes Van Rijswick, Eindhoven (NL); Wijnand Evert Jacobus Van Kooten, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/900,535

(22) Filed: Oct. 8, 2010

(65) Prior Publication Data

US 2011/0025205 A1 Feb. 3, 2011

Related U.S. Application Data

(63) Continuation of application No. 11/575,761, filed as application No. PCT/IB2005/053071 on Sep. 19, 2005, now Pat. No. 7,810,974.

(30) Foreign Application Priority Data

Sep. 29, 2004 (EP) .................................... 04104740

(51) Int. Cl.
*F21V 7/04* (2006.01)
(52) U.S. Cl. ......... 362/555; 362/551; 362/800; 362/650
(58) Field of Classification Search .................. 362/551, 362/800, 231, 555, 650
See application file for complete search history.

(56) References Cited

U.S. PATENT DOCUMENTS

| | | | |
|---|---|---|---|
| 5,345,531 | A | 9/1994 | Keplinger et al. |
| 5,428,515 | A | 6/1995 | Jung |
| 6,234,645 | B1 | 5/2001 | Borner et al. |
| 6,337,946 | B1 | 1/2002 | McGaffigan |
| 6,404,973 | B1 | 6/2002 | Lee |
| 6,450,041 | B1 | 9/2002 | Ali |

(Continued)

FOREIGN PATENT DOCUMENTS

EP 0974796 1/2000

(Continued)

OTHER PUBLICATIONS

Klaus Komarek: "Glasfaserkabel Zur Lichtverteilung", WWW.WER-WEISS-WAS.DE/THEME59/ARTICLE2735415.HTML, 2005, XP002421230.

*Primary Examiner* — Anabel Ton
(74) *Attorney, Agent, or Firm* — Mark L. Beloborodov

(57) ABSTRACT

The invention relates to a lighting device (1) comprising an envelope (2), a base (3), a solid-state light source (4) and optical means (5) provided with a light-outcoupling surface, the solid-state light source (4) being optically coupled to said optical means (5). The use of a spirally wound optical fiber as optical means (5) and a transparent envelope (2) shaped as a conventional light bulb provides a lighting device (1) which is a good look-alike of the conventional incandescent lamp, such as, for instance, the carbon filament lamp. The long lifetime and high efficiency of LEDs as a solid-state light source (4) will make this lighting device (1) a very attractive alternative for the conventional incandescent lamp. The lighting device (1) according to the present invention has the further advantage that a large gamut of colors can be chosen and adjusted by using, for instance, red green and blue LEDs in said lighting device (1). The electronics for driving and controlling the intensity and color settings can be incorporated in the lighting device (1).

11 Claims, 3 Drawing Sheets

| U.S. PATENT DOCUMENTS | | | | FOREIGN PATENT DOCUMENTS | | |
|---|---|---|---|---|---|---|
| 6,586,882 B1 | 7/2003 | Harbers | | EP | 1379819 | 1/2004 |
| 6,767,111 B1 | 7/2004 | Lai | | GB | 00004576 | 0/1879 |
| 6,974,777 B2 | 12/2005 | Moeggenborg et al. | | JP | 2002196155 | 7/2002 |
| 7,111,972 B2 | 9/2006 | Coushaine et al. | | WO | 0063977 | 10/2000 |
| 7,160,012 B2 | 1/2007 | Hilscher et al. | | WO | 0140702 | 6/2001 |
| 7,258,476 B2 | 8/2007 | Peng et al. | | WO | 03021329 | 3/2003 |
| 7,455,444 B2 | 11/2008 | Chien | | WO | 03059012 | 7/2003 |

LIGHTING DEVICE

The invention relates to a lighting device comprising an envelope, a base and a solid-state light source.

A lighting device as mentioned in the opening paragraph is known from U.S. Pat. No. 6,586,882. This US patent discloses a lighting system which comprises opto-electronic elements, such as, for instance, light-emitting diodes, which emit light in a first wavelength range, preferably blue light. Furthermore, the lighting system is provided with conversion means for absorbing light emitted by the opto-electronic elements and re-emitting light in a second wavelength range. The conversion means may be provided on a body which is a spiral-shaped coil. With an envelope shaped as the well-known bulb, this lighting system resembles a carbon filament lamp.

Although it is possible to have a high-efficiency look-alike of the carbon filament with the lighting system as disclosed in U.S. Pat. No. 6,586,882, this lighting system has the drawback that the light emitted by the opto-electronic elements has to be converted into light having the appropriate wavelength, which is complicated and detrimental to its efficiency. A further drawback is the multi-layer optical coating on the inner side of the envelope, which is required for reflecting the light emitted from the LEDs towards the conversion means. It makes this lighting system complex and expensive.

It is an object of the present invention to provide a lighting device which does not have the above-mentioned drawbacks and in which the light emitted by the solid-state light source is used directly for lighting purposes. A further advantage of the present invention is the large variety of colors that may be generated by this lighting device.

According to the present invention, this object is realized by a lighting device which is characterized in that it further comprises optical means provided with a light-outcoupling surface, the solid-state light source being optically coupled to said optical means.

The invention is based on the recognition that it will be possible to transfer the light emitted by a solid-state light source to the optical means by optically coupling said solid-state light source to the optical means. These optical means form a separate element inside the lighting device and are not integrated with the envelope. Furthermore, the optical means have to be provided with a surface which allows outcoupling of the light from said optical means. This can be achieved by choosing an appropriate surface roughness of the optical means.

In this manner, the lighting device according to the present invention will emit the light from the solid-state light source with the same spectral distribution as generated by said solid-state light source.

In a preferred embodiment, the solid-state light source comprises at least one LED. The use of LEDs—Light Emitting Diodes—is widely spread in present-day lighting applications. The large availability and interesting price make LEDs a preferred light source for these types of lighting devices. By using one LED, the color of the lighting device is determined by the choice of LED. For instance, by using an amber-colored LED, a nice and cosy light can be made for use in living rooms.

In a further embodiment, the solid-state light source comprises three LEDs which, in operation, emit light of different colors. The use of three LEDs provides the possibility of choosing the desired color from a large color gamut in the 1931 CIE Chromaticity Diagram: that is, all the colors enclosed by the triangle, with the colors of the three LEDs at the vertices. By changing the ratio of the intensities between the three differently colored LEDs, all the colors within said triangle can be adjusted.

In further embodiments, the optical means comprise an optical fiber, which may be spirally wound. The use of optical fibers allows a large variety of very decorative lamps. One or both ends of the fiber have to be optically coupled to the LED. When three LEDs are used, it is possible to use only one optical fiber which is coupled to the three LEDs. The optical fiber thus receives and emits the mixed color generated by the three LEDs. Alternatively, it is possible to use separate optical fibers, coupled to each individual LED. Consequently, the lamp will have three optical fibers each emitting a different color of light. It is also possible to couple one or both ends of the optical fiber to the LED or LEDs. The latter situation, with both ends coupled, allows a more homogeneous light distribution across the optical fiber.

A further embodiment is characterized in that the envelope has an inner surface which is provided with a coating of luminescent material.

By coating the inner surface with a luminescent material, it will be possible to make an even larger variety of colored lamps, even when only one LED is used.

The lighting device preferably has a screw base or a bayonet base.

Most present-day conventional light bulbs are provided with a screw base—like the well-known E14, E26 or E27 base—or a bayonet base. By providing a lighting device according to the present invention with the same type of base, it is compatible with existing light bulbs so that it is very easy to replace the existing lamp with the new lighting device.

Furthermore, the base of the lighting device may comprise electronic driving means provided with a power supply for driving the solid-state light source. This electronic driving means will transfer the mains voltage input of the lighting device into an output value suitable for driving a solid-state light source. Additionally, the electronic driving means are further provided with a control unit which is arranged to control the light output and/or color of said lighting device. This feature will allow control of the light intensity—a dimming feature—and/or control of the color of the lighting device. For example, this control may be carried out by means of a remote control user interface.

These and other aspects of the invention are apparent from and will be elucidated by way of non-limiting examples with reference to the drawings and the embodiments described hereinafter.

Figure 1:
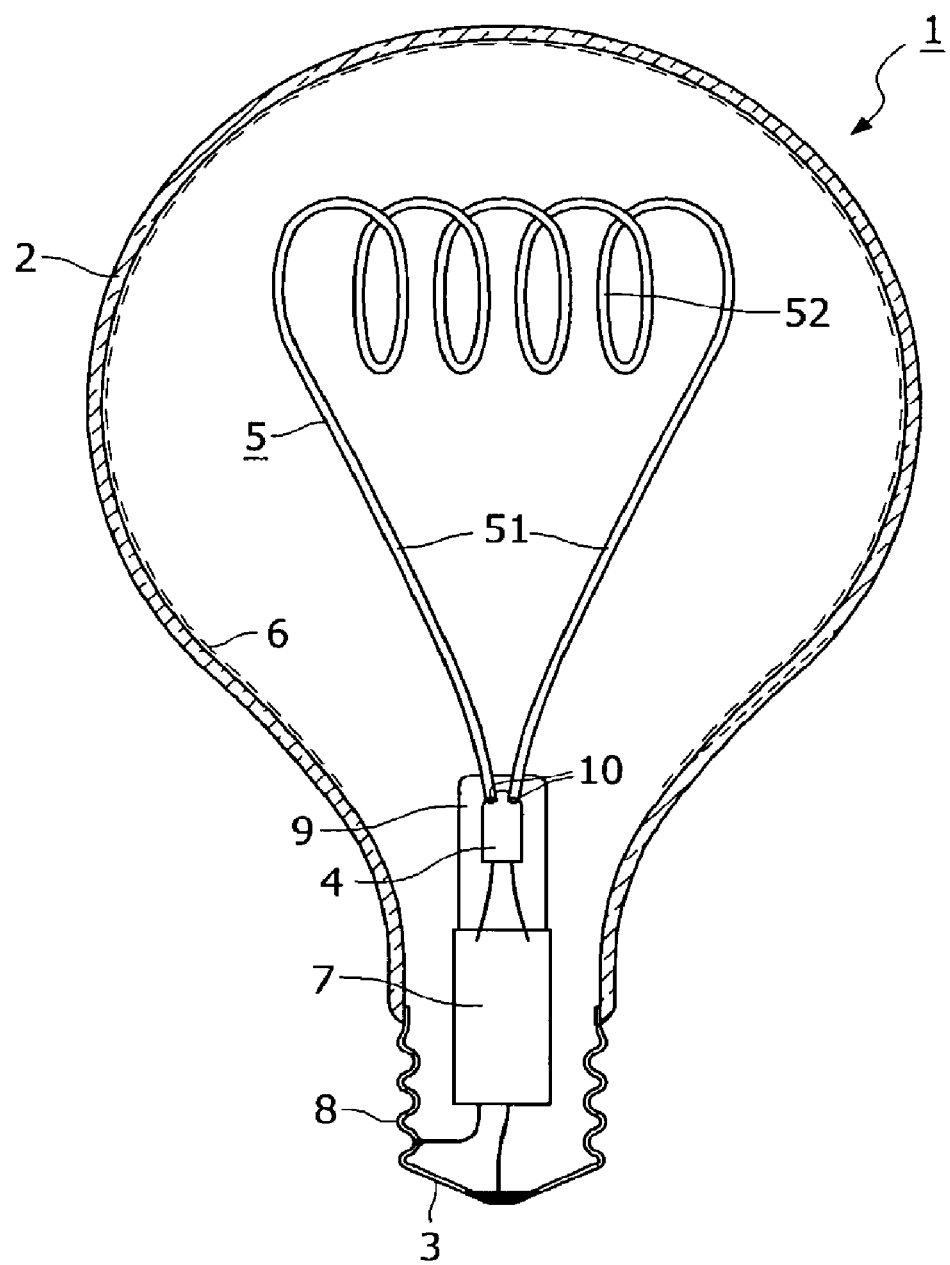
FIG. 1 shows schematically the lighting device according to the invention.

FIG. 1 shows an example of a lighting device 1 according to the present invention. This lighting device has an envelope 2, for instance, a glass bulb, familiar to the well-known light bulb. It should be noted that a solid-state lighting device does not require an evacuated envelope 2. The envelope 2 may also contain air or some other gas. This envelope 2 is connected to a base 3 formed as a screw base 8 or a bayonet base on its outer side in order to make it compatible with current light bulbs.

The interior of the lighting device 1 comprises a solid-state light source 4, such as, for instance, one or more LEDs, and electronic driving means 7 for transforming the mains voltage input—230 V AC or 110 V AC—into a signal suitable for driving the solid-state light source 4.

The lighting device 1 further has an optical fiber 5 which is coupled to the solid-state light source 4. In operation, the solid-state light source 4 emits light and transmits this light to the optical fiber 5. The optical fiber 5 is provided with a light-outcoupling surface, due to which the light is emitted from the optical fiber 5. This light-outcoupling surface may be designed in such a way that the optical fiber 5 emits the light homogeneously throughout its surface. Alternatively, for a spirally wound optical fiber, it may be designed to emit relatively more light from the spiralled part 52 and less from the parts 51, forming the connection between the spiralled part 52 and the solid-state light source 4. This may be accomplished, for instance, by the choice of the surface roughness along the optical fiber 5. In this way, the emission along the fiber will strongly resemble the emission of a carbon filament lamp.

In FIG. 1, both ends 10 of the optical fiber 5 are connected to the solid-state light source 4. The light emitted by said solid-state light source 4 now enters the optical fiber 5 on both sides, which will lead to a more homogeneous light distribution across the optical fiber 5. Alternatively, only one of the ends 10 of the optical fiber 5 can be optically coupled to the solid-state light source 4, in which case the other end 10 is not in optical contact with the solid-state light source 4.

A further option is to optically couple both ends 10 of the optical fiber 5 to different LEDs of the solid-state light source 4, thus allowing a higher light output of the lighting device 1.

In the embodiment of FIG. 1, a shielding 9, which prevents direct view into the light source, surrounds the solid-state light source 4.

If the envelope 2 is made of transparent glass, this lighting device 1 will have a high decorative value. By using amber LEDs and a spirally wound optical fiber, this lighting device 1 will strongly resemble the well-known carbon filament lamps which are frequently used for creating a nice ambience. The carbon filament lamp has the drawback that it is expensive and vulnerable, and that it has a very low luminous efficacy. The lighting device 1 according to the present invention overcomes these drawbacks: it can be used to create a nice atmosphere, while providing a high light output, together with an extremely long lifetime. By way of comparison, amber LEDs have a typical luminous efficacy of 20-40 lm/W and a lifetime of over 75,000 hours, as against the carbon filament lamps with a luminous efficacy of 2-3 lm/W and a lifetime of less than 1000 hours. This makes these types of lighting devices particularly suitable for professional decorative applications, in which it is of great importance to have low service costs and a low energy consumption.

A further feature that may be incorporated in the lighting device 1 is a coating 6 of luminescent material provided on the inner side of the envelope 2. This coating 6 can change the color of the light emitted from the solid-state light source 4. Furthermore, the appearance of the lighting device 1—when the envelope 2 is bulb-shaped—will be a look-alike of a diffuse incandescent lamp. These lighting devices are very suitable for replacing incandescent lamps.

Figure 2:
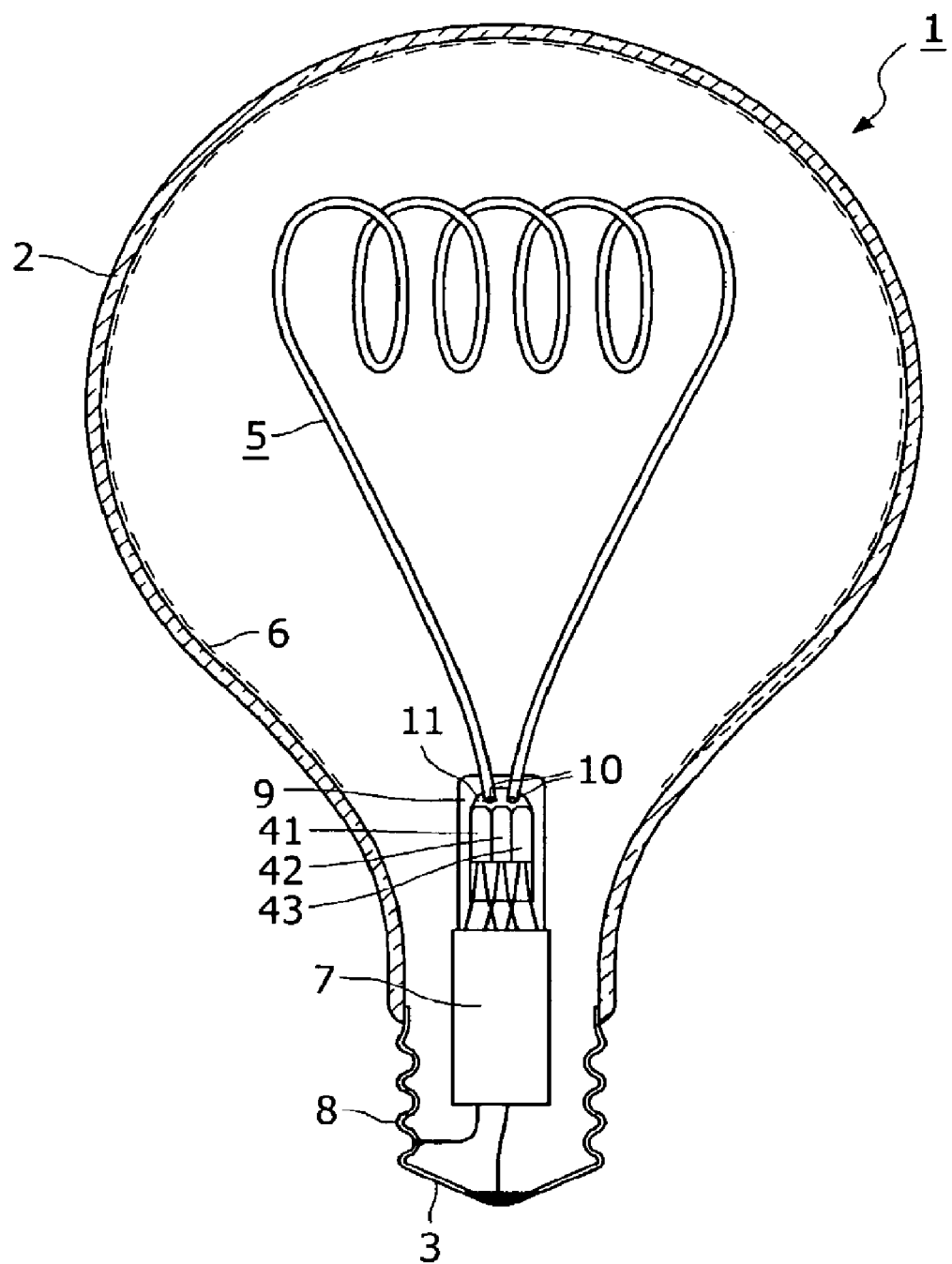
FIG. 2 shows an embodiment according to the invention, with three LEDs and one common optical fiber.
Figure 3:
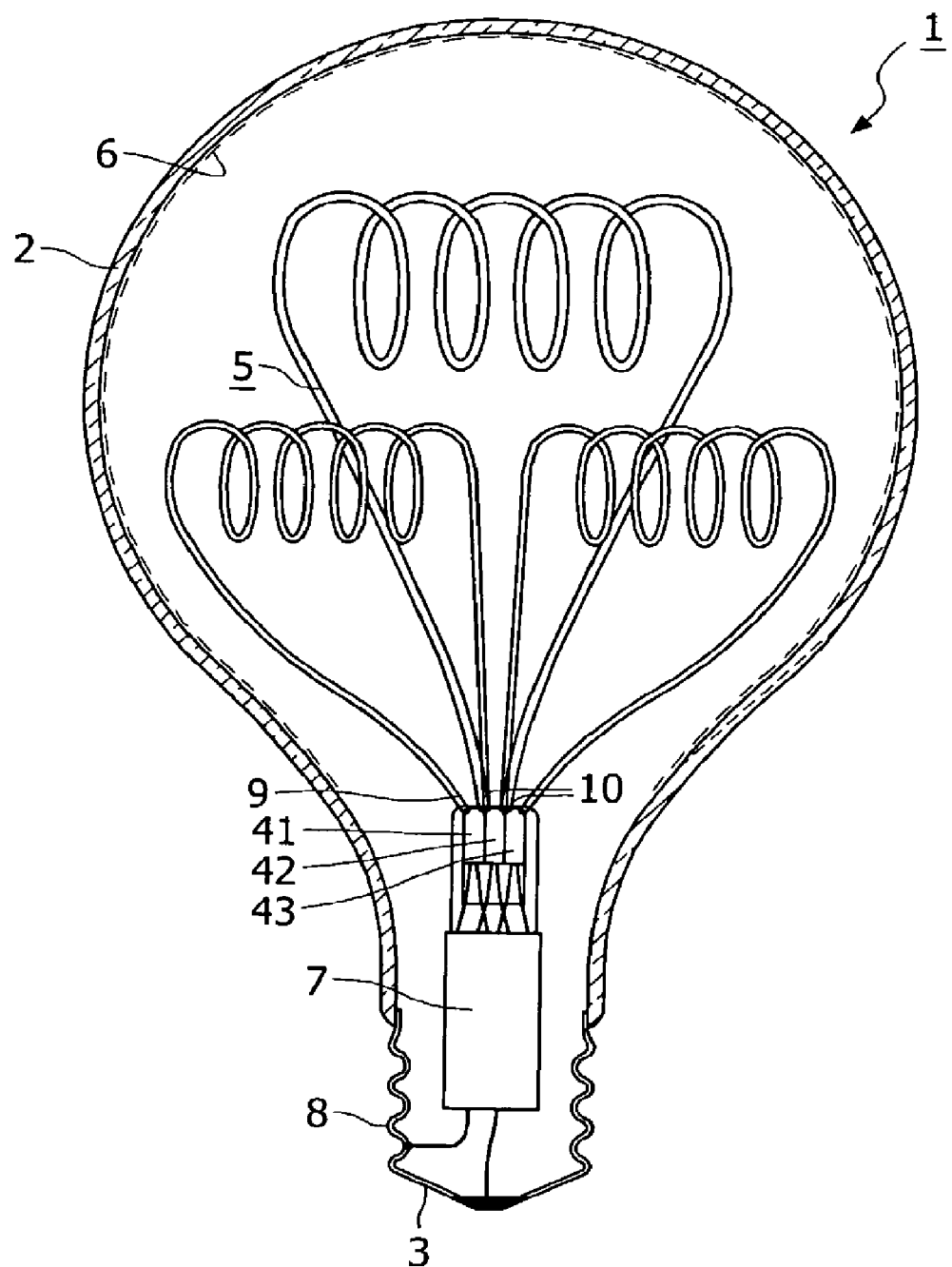
FIG. 3 shows an embodiment according to the invention, with three LEDs each with a separate optical fiber.

FIGS. 2 and 3 show embodiments with a solid-state light source comprising three LEDs 41, 42, 43. These three LEDs 41, 42, 43 preferably have three different colors, for instance, red, green and blue. Then it will be possible to adjust the lighting device 1 to all the colors in accordance with the color triangle of the 1931 CIE chromaticity diagram, with the three LED colors at the vertices. In particular, this allows the choice of a large variety of white settings.

In FIG. 2, the light emitted by the three LEDs 41, 42, 43 is mixed before it enters the optical means 5, such as, for instance, the optical fiber. The three colors may be mixed by a light-scattering element 11 which is placed on top and is in optical contact with the LEDs 41, 42, 43. The ends 10 of the optical fiber are in optical contact with this light-scattering element 11 to pick up the homogeneous mixed light.

In FIG. 3, an optical fiber is applied for each LED 41, 42, 43 of the solid-state light source 4. The optical fiber can be coupled to each LED 41, 42, 43 in a similar way as in the case of only one LED. This lighting device 1 has an even higher decorative value, because it will have three optical fibers, each emitting light of a different color.

It is an advantage when a lighting device 1 according to the present invention can be used as a replacement for the commonly used incandescent lamps. It is therefore preferred that the base 3 of the lighting device 1 is a screw base or a bayonet base. Particularly, screw bases of the type E14, E26 or E27 are frequently used for lamps.

For the lighting device 1 to be fully compatible with the standard incandescent lamp, it is required that said lighting device 1 contains electronic driving means 7 provided with a power supply for converting the mains voltage supply—normally 230 V AC or 110 V AC—into an output signal suitable for driving a solid-state light source 4, normally about 2 V DC. Additionally, these electronic driving means 7 may contain electronic circuitry for controlling the color and intensity—or light output—settings of the lighting device 1. The color and intensity may be controlled by a remote control unit, buttons on the base 3 or by another type of user interface. To this end, the driving means 7 may comprise a power supply and a control unit for intensity and color settings. These electronic driving means can be provided in the base 3.

This invention is not limited to lighting devices shaped as conventional light bulbs with a transparent envelope or with an envelope coated with a luminescent material on the inner side, and provided with a standardized base. The invention is also applicable to tubular-shaped lamps with, for instance, the connectors at both ends of the tube, but also non-compatible lighting devices may be considered.

In summary, the invention relates to a lighting device 1 comprising an envelope 2, a base 3, a solid-state light source 4 and optical means 5 provided with a light-outcoupling surface, the solid-state light source 4 being optically coupled to said optical means 5. The use of a spirally wound optical fiber as optical means 5 and a transparant envelope 2 shaped as a conventional light bulb provides a lighting device 1 which is a good look-alike of the conventional incandescent lamp, such as, for instance, the carbon filament lamp. The long lifetime and high efficiency of LEDs as a solid-state light source 4 will make this lighting device 1 a very attractive alternative for the conventional incandescent lamp. The lighting device 1 according to the present invention has the further advantage that a large gamut of colors can be chosen and adjusted by using, for instance, red green and blue LEDs in said lighting device 1. The electronics for driving and controlling the intensity and color settings can be incorporated in the lighting device 1.

The invention claimed is:

1. A lighting device comprising:
   an envelope,
   a base,
   an LED light source, and
   at least one spirally wound optical fiber disposed within the envelope, the optical fiber having two ends, a light-outcoupling surface, and designed to emit relatively more light from a spiraled portion and less light from a non-spiraled portion, the solid-state light source being optically coupled to at least one end of said non-spiraled portion.

2. The lighting device as claimed in claim 1, wherein the LED light source comprises at least three LEDs which, in operation, emit light of different colors.

3. The lighting device as claimed in claim 2, comprising at least three spirally wound optical fibers, each optical fiber coupled to each of the three LEDs.

4. The lighting device as claimed in claim 1, wherein both ends of the optical fiber are coupled to the LED light source.

5. The lighting device as claimed in claim 1, wherein the envelope has an inner surface comprising a coating of luminescent material.

6. The lighting device as claimed in 1, further comprising:
   electronic driving means including a power supply for driving the LED light source; and
   a control unit configured to control the intensity and/or color of light emitted by said LED light source.

7. A lighting device, comprising:
   an envelope having an inner surface comprising a coating of luminescent material,
   a solid-state light source, and
   optical means having a light-outcoupling surface and disposed within said envelope, the optical means designed to emit relatively more light from a spiraled portion and less light from a non-spiraled portion, the solid-state light source being optically coupled to said optical means,
   wherein the light emitted by light-outcoupling surface of the non-spiraled portion has substantially the same spectral distribution as light generated by the solid-state light source.

8. The lighting device as claimed in claim 7, wherein the solid-state light source comprises at least one LED.

9. The lighting device as claimed in claim 7, wherein the LED light source comprises at least three LEDs which, in operation, emit light of different colors.

10. The lighting device as claimed in claim 7, further comprising a power supply for driving the LED light source, and a control unit configured to control the intensity and/or color of light emitted by said LED light source.

11. The lighting device as claimed in claim 10, further comprising a screw-type or bayonet-type base in electrical communication with the power supply.

\* \* \* \* \*